(12) United States Patent
Prang et al.

(10) Patent No.: US 10,788,262 B2
(45) Date of Patent: Sep. 29, 2020

(54) PROCESS FOR THE PREPARATION OF A DRIED POWDER

(71) Applicant: Basell Polyolefine GmbH, Wesseling (DE)

(72) Inventors: Harald Prang, Erftstadt (DE); Michael Chatterjee, Bruehl (DE); Reinhard Kuehl, Bornheim (DE); Alexander Seifert, Erftstadt (DE)

(73) Assignee: Basell Polyolefine GmbH, Wesseling (DE)

( * ) Notice: Subject to any disclaimer, the term of this patent is extended or adjusted under 35 U.S.C. 154(b) by 102 days.

(21) Appl. No.: 16/076,198

(22) PCT Filed: Feb. 14, 2017

(86) PCT No.: PCT/EP2017/053219
§ 371 (c)(1),
(2) Date: Aug. 7, 2018

(87) PCT Pub. No.: WO2017/140648
PCT Pub. Date: Aug. 24, 2017

(65) Prior Publication Data
US 2019/0339007 A1 Nov. 7, 2019

(30) Foreign Application Priority Data
Feb. 15, 2016 (EP) .................................... 16155648

(51) Int. Cl.
*F26B 3/084* (2006.01)
*B01J 8/00* (2006.01)
(Continued)

(52) U.S. Cl.
CPC ............. *F26B 3/084* (2013.01); *B01J 8/0015* (2013.01); *B01J 8/1845* (2013.01); *B01J 8/26* (2013.01);
(Continued)

(58) Field of Classification Search
CPC .......... F26B 3/084; F26B 21/14; C08F 10/02; C08F 6/24; C08F 6/005; C08F 2/14;
(Continued)

(56) References Cited

U.S. PATENT DOCUMENTS 3,851,406 A * 12/1974 Dumitru ................ B01J 8/0285
34/578
5,799,412 A 9/1998 Yamamoto et al.
(Continued)

FOREIGN PATENT DOCUMENTS

CN 1167779 A 12/1997
CN 1674965 A 9/2005
(Continued)

OTHER PUBLICATIONS

The International Search Report and Written Opinion for PCT/EP2017/053219 dated May 11, 2017.

*Primary Examiner* — Jessica Yuen

(57) ABSTRACT

A method for preparing a dried powder is provided. The facility includes a first drying chamber having a heating element and a second drying chamber. A mixture of powder and diluent is introduced into the first drying chamber. A pre-dried powder is transferred from the first drying chamber into the second drying chamber. A dried powder, including a recirculated amount of powder and a discharge amount of powder, is formed in the second drying chamber. The recirculated amount of the dried powder is transferred by a conveyor device from the second drying chamber into the first drying chamber. The discharge amount of the dried powder is discharged from the second drying chamber.

18 Claims, 2 Drawing Sheets

(51) Int. Cl.
*C08F 6/24* (2006.01)
*C08F 10/02* (2006.01)
*F26B 21/14* (2006.01)
*C08F 2/14* (2006.01)
*C08L 23/06* (2006.01)

(52) U.S. Cl.
CPC ............. *B01J 8/36* (2013.01); *C08F 6/005* (2013.01); *C08F 6/24* (2013.01); *C08F 10/02* (2013.01); *F26B 21/14* (2013.01); *B01J 2208/0015* (2013.01); *B01J 2208/00884* (2013.01); *B01J 2219/00006* (2013.01); *C08F 2/14* (2013.01); *C08L 23/06* (2013.01)

(58) Field of Classification Search
CPC .. C08F 6/20; C08L 23/06; C08L 23/04; B01J 8/36; B01J 8/26; B01J 8/1845; B01J 8/0015; B01J 2219/00006; B01J 2208/00884; B01J 2208/0015
See application file for complete search history.

(56) References Cited

U.S. PATENT DOCUMENTS

| | | | | |
|---|---|---|---|---|
| 6,101,739 | A | * | 8/2000 | Rutz ................ B01D 53/34 34/373 |
| 7,087,139 | B1 | | 8/2006 | Berti et al. |
| 8,034,896 | B2 | | 10/2011 | Damme et al. |
| 8,598,310 | B2 | | 12/2013 | Chamayou et al. |
| 9,527,104 | B2 | | 12/2016 | Ledoux et al. |
| 9,637,569 | B2 | | 5/2017 | Neumann et al. |
| 9,803,919 | B2 | | 10/2017 | Benje et al. |
| 2006/0032435 | A1 | | 2/2006 | Huettlin et al. |
| 2009/0221788 | A1 | | 9/2009 | Damme |
| 2010/0041825 | A1 | | 2/2010 | Damme et al. |
| 2014/0318446 | A1 | | 10/2014 | Ledoux et al. |

FOREIGN PATENT DOCUMENTS

| | | |
|---|---|---|
| CN | 101384407 A | 3/2009 |
| CN | 101400724 A | 4/2009 |
| CN | 103483471 A | 1/2014 |
| CN | 103608633 A | 2/2014 |
| EP | 525748 A1 | 2/1993 |
| EP | 801081 A2 | 10/1997 |
| EP | 1832620 A1 | 9/2007 |
| EP | 2404942 A1 | 1/2012 |
| RU | 2464080 C2 | 10/2012 |
| WO | 2004018522 A2 | 3/2004 |
| WO | 2004071647 A1 | 8/2004 |
| WO | 2009134142 A1 | 11/2009 |
| WO | 2015091384 A1 | 6/2015 |
| WO | 2015188267 A1 | 12/2015 |

* cited by examiner

PROCESS FOR THE PREPARATION OF A DRIED POWDER

This application is the U.S. National Phase of PCT International Application PCT/EP2017/053219, filed Feb. 14, 2017, claiming benefit of priority to European Patent Application No. 16155648.5, filed Feb. 15, 2016, the disclosures of which are incorporated herein by reference in their entirety.

FIELD OF THE INVENTION

In general, the present disclosure relates to field of chemistry. More specifically, the present disclosure relates to powders. In particular, the present disclosure relates to a method for preparing a dried powder from a mixture of diluent and powder.

BACKGROUND OF THE INVENTION

Drying methods for powders include tray drying and fluidized bed drying. Fluidized bed drying provides controlled and uniform drying conditions.

Fluidized bed drying may have limitations. For example, a wet cake or slurry may not be readily fluidizable. In some instances and even when fluid consistency is achieved, the wet cake may not be fluidized entirely. As an associated problem, portions of the cake may plug openings or apertures in grids, thereby resulting in a built-up of wet material. Additionally, the non-fluidized portions may cover heating elements, thereby decreasing heating efficiency. Moreover, these problems can require system stoppages and cleaning. Also, depending on the composition of the powder, cleanup may include treating elements of the system to render the surfaces inert. Furthermore, high temperatures may not be suitable for various powders.

While recirculation of material can be used to fluidize a feed material that is not readily fluidizable, recirculation may decrease throughput and not avoid additional cleaning.

SUMMARY OF THE INVENTION

In a general embodiment, the present disclosure provides a method for the preparation of a dried powder in a facility including preparation steps, wherein the facility includes
i) a first drying chamber with a first upper end section, an opposing first lower end section and a first chamber side wall, the first drying chamber being a back-mixing drying chamber including a first heating element, a first powder inlet for receiving a mixture of powder and diluent, a first powder outlet for exiting a pre-dried powder, a first gas inlet and a first gas outlet,
ii) a second drying chamber with a second upper end section, an opposing second lower end section and a second chamber side wall, the second drying chamber including a second heating element, a second powder inlet for receiving the pre-dried powder, a second powder outlet for exiting a dried powder made from or containing a recirculated amount of dried powder and a discharge amount of dried powder, a second gas inlet and a second gas outlet,
iii) a first powder passage for transferring the pre-dried powder from the first drying chamber into the second drying chamber, having the first powder outlet connected to the second powder inlet or being identical with the second powder inlet, iv) a conveyor device and optionally a second powder passage for transferring the recirculated amount of dried powder from the second drying chamber into the first drying chamber.

wherein in the facility, (A) the mixture of powder and diluent, having a first average concentration by weight of diluent based upon the total weight of the mixture, is introduced through the first powder inlet into the first drying chamber and (B) the pre-dried powder, having a second average concentration by weight of diluent based upon the total weight of the pre-dried powder, is transferred from the first drying chamber into the second drying chamber through the first powder passage, wherein a first amount of the diluent is removed from the mixture after passage through the first drying chamber, yielding the pre-dried powder, and a second amount of the diluent is removed from the pre-dried powder after passage through the second drying chamber, yielding the dried powder, having a third average concentration by weight of diluent based upon the total weight of the dried powder, wherein the first average concentration of diluent is higher than the second average concentration of diluent and the second average concentration of diluent is higher than the third average concentration of diluent, wherein (C) the recirculated amount of the dried powder is transferred from the second drying chamber into the first drying chamber using the conveyor device and optionally the second powder passage and wherein (D) the discharge amount of the dried powder is discharged from the second drying chamber.

In some embodiments, the method includes the following preparation steps:

a) introducing a mixture of powder and diluent through a first powder inlet into a first drying chamber, b) heating the mixture by a first heating element to a first temperature in a first gas flow introduced through a first gas inlet and discharged through a first gas outlet, yielding a pre-dried powder, c) transferring the pre-dried powder through a first powder passage into a second drying chamber, d) heating the pre-dried powder by a second heating element to a second temperature in a second gas flow introduced through a second gas inlet and discharged through a second gas outlet, yielding the dried powder made from or containing a recirculated amount of dried powder and a discharge amount of dried powder, and e) transferring the recirculated amount of the dried powder through the conveyor device and optionally through the second powder passage from the second drying chamber into the first drying chamber, and discharging the discharge amount of the dried powder through the second powder outlet from the second drying chamber.

In some embodiments, the first average concentration of diluent in the mixture of powder and diluent is higher than the second average concentration of diluent in the pre-dried powder and the second average concentration of diluent in the pre-dried powder is higher than the third average concentration of diluent in the dried powder. In some embodiments, the first average concentration of diluent in the mixture of powder and diluent is in the range of from about 15 wt. % to about 50 wt. %, based upon the total weight of the mixture, and the third average concentration of diluent in the dried powder is less than about 10 wt. %, based upon the total weight of the dried powder.

In some embodiments, the powder is a polymer powder.

In some embodiments, the powder is a polyolefin powder.

In some embodiments, the mixture of powder and diluent is a mixture of polyethylene and a hydrocarbon diluent.

In some embodiments, the polyolefin is a bimodal or multimodal polyolefin.

In some embodiments, the first and second gas flows are selected from a nitrogen gas flow or a hydrocarbon gas flow. In some embodiments, the first gas flow, the second gas flow, and the diluents are recycled.

In some embodiments, the temperatures of the first and second heating elements are in the range from about 60 to about 125° C. In some embodiments, the first and second heating elements are heated using water or steam.

In some embodiments, an average combined residence time of powder in the first and second drying chamber is less than about 60 min. In some embodiments, the average recirculated amount of dried powder is in the range of about 5 to about 60 weight %, based upon the average total weight of the dried powder.

In some embodiments, the facility further includes a first grid as a first intermediate floor made from or containing a heat resistant material, wherein the first powder outlet and the first gas outlet are arranged above the first grid and the first gas inlet is arranged below the first grid such that the first grid separates the first powder inlet and the first powder outlet from the first gas inlet, wherein the first grid is a first intermediate floor upon which powder is deposited in the first chamber, wherein a first gas is conducted from the first gas inlet through the first grid into the first gas outlet. In some embodiments, the facility includes a second grid as a second intermediate floor made from or containing a heat resistant material, wherein the second powder outlet and the second gas outlet are arranged above the second grid and the second gas inlet is arranged below the second grid such that the second grid separates the second powder inlet and the second powder outlet from the second gas inlet, wherein the second grid is a second intermediate floor upon which powder is deposited in the second chamber and a second gas is conducted from the second gas inlet through the second grid into the second gas outlet.

In some embodiments, the first chamber side wall (a) is a section of the second chamber side wall or is arranged next to the second chamber side wall and (b) includes the first powder passage, which first powder passage is a first aperture in the first chamber side wall.

In some embodiments, the conveyor is selected from the group consisting of a spiral conveyor, a tube chain conveyor and a pneumatic conveying device.

In some embodiments, the first and second heating elements are of the tube bundle type or of the plate type and are arranged inside the chamber at a distance from the first and second chamber walls. In some embodiments, the first heating element is in thermal operative connection with the first chamber side wall or integrated into the first chamber side wall and the second heating element is in thermal operative connection with the second chamber side wall or integrated into the second chamber side wall.

In a general embodiment, the present disclosure provides a process for the preparation of a polyolefin including the steps of a) continuously polymerizing an olefin monomer in a diluent at temperatures of from about 20° C. to about 200° C. and pressures of from about 0.1 to about 20 MPa in the presence of a polymerization catalyst in a polymerization reactor, thereby yielding a slurry made from or containing solid polyolefin particles and a diluent, b) mechanically separating the polyolefin particles from an amount of the diluent, yielding a mixture of polyolefin powder and diluent having a lower content of diluent than the slurry obtained in polymerizing step (a), and c) drying the mixture of polyolefin powder and diluent obtained in separating step b).

BRIEF DESCRIPTION OF THE DRAWINGS

The following figures illustrate preferred embodiments of the subject matter disclosed herein. The claimed subject matter may be understood by reference to the following description taken in conjunction with the accompanying figures, in which like reference numerals identify like elements, and in which:

DETAILED DESCRIPTION OF THE INVENTION

Figure 1:
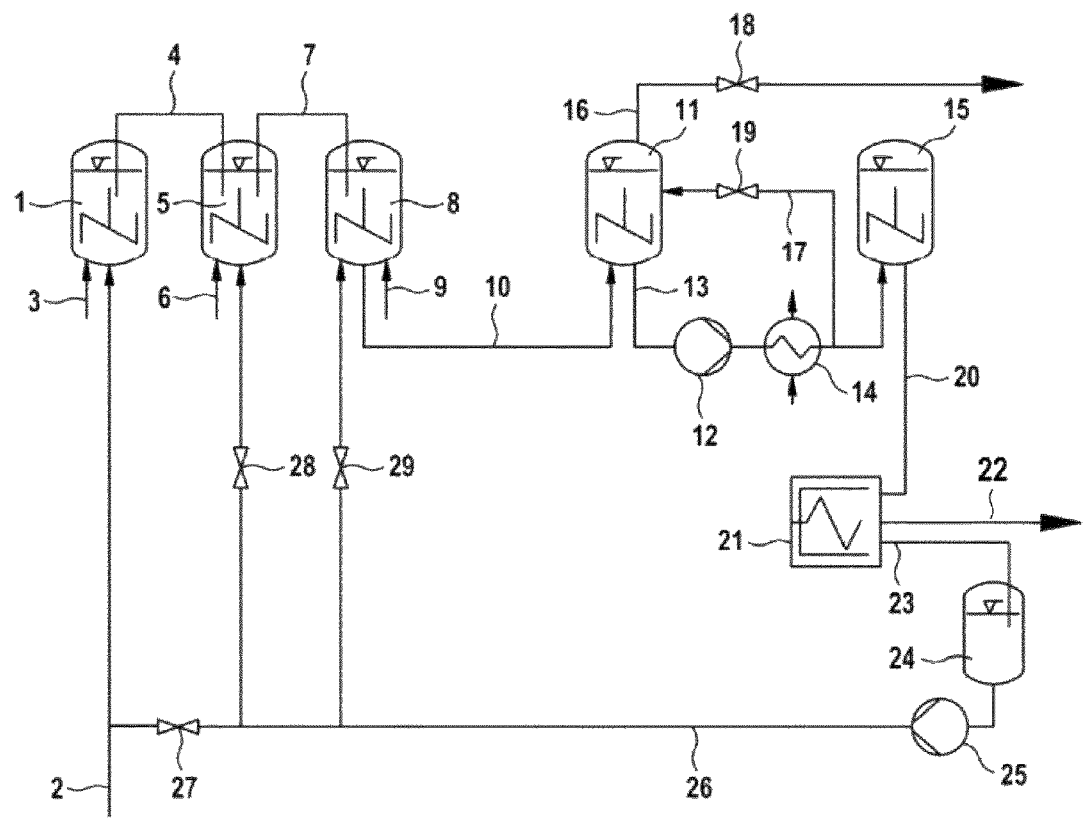
FIG. 1 is a schematic view of the method of the preparation of a polymer powder prior to the drying stage.

As used herein, the term "powder" relates to a multitude of solid particles that are capable of flowing in a dried state. However, the term does not necessarily relate to a specific consistency if powder is mixed with a diluent. If very little liquid is used, this will barely affect the properties of the powder. If more liquid is combined with powder, a cake may be formed that is solid to some degree. If even more diluent is used, a slurry or suspension is formed. In some embodiments, powder relates to a particulate material having a mean particle diameter of from about 50 µm to about 3000 µm.

As used herein, the term "dried" or "drying" refers to the thermally assisted removal of a diluent, which may be any liquid. In some embodiments, the liquid is a hydrocarbon liquid or water. In some embodiments, the liquid is a hydrocarbon liquid.

In some embodiments, the drying chambers of the facility includes various inlets and outlets for feeding and withdrawing powder and gas to and from the drying chambers. In some embodiments, each of these inlets and outlets can be a single inlet or outlet. In some embodiments, these inlets or outlets are constructed as a plurality of inlets and outlets. In some embodiments, each of these inlets and outlets is a combination of two, three, four or more of these inlets and outlets. In some embodiments, the first powder inlet is a combination of from two to eight first powder inlets, alternatively from two to six first powder inlets, alternatively from two to four first powder inlets.

In some embodiments, the first powder passage for transfer of powder from the first drying chamber into the second drying chamber is or includes an aperture in the first wall of the first chamber. In some embodiments, the first wall is (a) part of the second chamber or directly adjacent to the second chamber and (b) identical with the second powder inlet. In some embodiments, the powder passage is formed by a tube or pipe having two endings that are forming the first powder outlet and the second powder inlet. In some embodiments, the powder passage is formed by an intermediate chamber connected to the first powder inlet and the second powder outlet.

In some embodiments, the method includes the following steps:

a) introducing the mixture of powder and diluent, having a first average concentration by weight of diluent based upon the total weight of the mixture, through the first powder inlet into the first drying chamber,
b) heating the mixture with the first heating element to a first temperature in a first gas flow introduced through the first gas inlet and discharged through the first gas outlet, yielding a pre-dried powder having a second average concentration by weight of diluent based upon the total weight of the pre-dried powder,
c) transferring the pre-dried powder through the first powder passage into the second drying chamber,
d) heating the pre-dried powder with the second heating element to a second temperature in a second gas flow introduced through the second gas inlet and discharged through the second gas outlet, yielding a dried powder (I) having a third average concentration by weight of diluent based upon the total weight of the dried powder and (II) made from or containing a recirculated amount of dried powder and a discharge amount of dried powder, and
e) transferring the recirculated amount of dried powder through the conveyor device and optionally the second powder passage from the second drying chamber into the first drying chamber, and discharging the discharged amount of the dried powder through the second powder outlet from the second drying chamber.

In some embodiments, separation of the diluent is accomplished by way of evaporation. In some embodiments, the evaporated diluent is trapped by condensation. In some embodiments, the condensation achieved by a condensation tower. In some embodiments, the evaporated diluent is separated from the gas of the first and second gas flow. In some embodiments, the mixture of powder and diluent is subjected to mechanical separation of the diluent before the mixture is introduced into the first drying chamber. In some embodiments, the mechanical separation of the diluent from the mixture reduces the concentration of diluent in the mixture to the range from about 15 to about 60 wt. %, based upon the total weight of the mixture.

The first average concentration of diluent is higher than the second average concentration of diluent and the second average concentration of diluent is higher than the third average concentration of diluent. In some embodiments, the third average concentration of diluent is at least about 75 weight % lower than the first average concentration, based upon the total weight of the mixture and the total weight of dried powder, alternatively at least about 90 weight % lower. In some embodiments, the first average concentration of diluent is in the range of about 15 wt. % to about 50 wt. %, based upon the total weight of the mixture and the third average concentration of diluent is less than about 10 wt. %, based upon the total weight of the dried powder, alternatively, less than about 1 wt. %, alternatively not above about 0.1 wt. %. In some embodiments, the method achieves a homogeneous distribution of the diluent in the powder present in the first chamber in a short period of time.

In some embodiments, the amount of diluent evaporated in the first drying chamber is from about 70 to about 97 wt. % of the amount of diluent evaporated in the drying facility, based upon the total weight of the mixture. In some embodiments, the amount of diluent evaporated in the second drying chamber is from about 3 to about 30 wt. % of the amount of diluent evaporated in the drying facility, based upon the total weight of the mixture.

In some embodiments, in transferring step c), transferring step e), or both transferring steps, the powder is transferred continuously.

In some embodiments, in transferring step c), transferring step e), or both transferring steps, the powder is transferred intermittently. In some embodiments, the transferring steps occur automatically, wherein the powder is removed regularly. In some embodiments, the powder is removed after a specific time interval.

In some embodiments, the first temperature is less than the second temperature. In some embodiments, the first temperature is in the range from about 50° C. to about 90° C., alternatively from about 55° C. to about 70° C. and the second temperature is in the range from about 60° C. to about 105° C., alternatively from about 75° C. to about 100° C.

In some embodiments, the powder is a polymer powder. In some embodiments, the mixture of powder and diluent is a mixture of polyethylene and a hydrocarbon diluent or a mixture of polypropylene and a hydrocarbon diluent.

In some embodiments, the polymers are bimodal or multimodal polyolefins. As used herein, the terms "bimodal" and "multimodal" refer to the modality of the polymer composition. In some embodiments, the modality refers to the molecular weight distribution. In some embodiments, "modality" indicates how many different polymerization conditions were utilized to prepare the polyolefin independent of whether the modality of the molecular weight distribution can be recognized as separated maxima in a gel permeation chromatography (GPC) curve. As used herein, the term "multimodal" can include bimodal.

In some embodiments, the temperatures of the first and second heating elements are in the range of about 60 to about 125° C., alternatively in the range of about 80 to about 120° C. In some embodiments, the first and second heating elements are heated using water or steam. In some embodiments, heating elements are selected from the group consisting of plate type heating elements and tube bundle type heating elements.

In some embodiments, the average combined residence time of powder in the first and second drying chamber is less than about 60 min, alternatively less than about 30 min. In some embodiments, the minimum average combined residence time is affected by the temperatures of the first and/or second heating elements, speed of the first and the second gas flow, the type of diluent, and the amount of recirculation.

In some embodiments, the average recirculating portion of powder is from about 5 to about 60 weight %, based upon the average total powder throughput, alternatively from about 10 to about 50 weight %.

In some embodiments, the facility includes a first grid as a first intermediate floor made from or containing a heat resistant material, wherein the first powder outlet and the first gas outlet are arranged above the first grid and the first gas inlet is arranged below the first grid such that the first grid separates the first powder inlet and the first powder outlet from the first gas inlet, wherein the first grid is a first intermediate floor upon which powder is fluidized in the first chamber. In some embodiments, the first grid is a perforated plate or a sparger plate. In some embodiments, more than one first powder inlets are employed. In some embodiments, the number of first powder inlets is in the range of two to six, alternatively two to four. In some embodiments, a first gas is conducted from the first gas inlet through the first grid into the first gas outlet. In some embodiments, the powder is dried by a first gas flow that flows through the grid and exits through the first gas outlet continuously transporting diluent. In some embodiments, the space below the first grid is divided into two or more separated compartments through which the first gas coming out of the first gas inlet is passed through the first grid, alternatively four compartments, alternatively five compartments, alternatively six compartments. In another embodiment a multitude of first gas inlets are employed below the grid, even with one or more of the aforementioned compartments.

In some embodiments, the second chamber of the facility includes a second grid as a second intermediate floor made from or containing a heat resistant material, wherein the second powder inlet, the second powder outlet and the second gas outlet are arranged above the second grid and the second gas inlet is arranged below the second grid such that the second grid separates the second powder inlet and the second powder outlet from the second gas inlet, wherein the second grid is a second intermediate floor upon which powder is fluidized in the second chamber and a second gas flow is conducted from the second gas inlet through the second grid into the second gas outlet. In some embodiments, the second grid is a perforated plate or a sparger plate. In some embodiments, the space below the second grid is divided into two or more separated compartments through which the second gas coming out of the second gas inlet is passed through the second grid, alternatively four compartments, alternatively five compartments, alternatively six compartments.

As used herein, the terms "upper", "top" or "above" as well as "lower", "bottom" or "below" refer to the arrangement of elements in the facility as assembled and as used and in accordance with the gravitational force of earth. Accordingly, a bottom section is closer to the center of earth than a top section.

In some embodiments, both chambers have a grid. In some embodiments, the chambers have similar dimensions. In some embodiments, the volume of the chambers does not differ more than about 75% from each other, alternatively not more than about 50%, alternatively not more than about 25%. As used herein, the term "volume" refers to the available space within a chamber.

In some embodiments, the first chamber side wall (A) constitutes a section of the second chamber side wall or is arranged next to the second chamber side wall and (B) includes the first powder passage, which first powder passage is a first aperture in the first chamber side wall. In some embodiments, the first chamber side wall includes a second powder passage (A) leading to the second drying chamber above the first powder passage, at an upper portion of the first chamber side wall, or both locations and (B) is a second aperture in the first chamber side wall. In some embodiments, some material passes from the first chamber through the second powder passage into the second chamber. In some embodiments, a conveyor device controls the flow rate of powder transferred from the second drying chamber to the first drying chamber. In some embodiments, the control occurs by adjusting the speed of the conveyor. In some embodiments, when products are difficult to fluidize, the flow rate is increased or kept at a minimum value. In some embodiments, a combination of a second powder passage and a conveyor device is used.

In some embodiments, the conveyor device is selected from a group consisting of a spiral conveyor, a tube chain conveyor and a pneumatic conveying device. In some embodiments, the conveyor devices are spiral conveyors, also called screw conveyors.

In some embodiments, the first and second heating elements are of the tube bundle type or of the plate type and are arranged inside the chamber at a distance from the first and second chamber walls.

In some embodiments, (A) the first heating element is in thermal operative connection with the first chamber side wall or integrated into the first chamber side wall, (B) the second heating element is in thermal operative connection with the second chamber side wall or integrated into the second chamber side wall, or (C) both.

In some embodiments, a first gas flow is conducted through the first chamber, wherein the first gas inlet introduces the first gas flow into the chamber and the first gas outlet emits the first gas flow from the first chamber. In some embodiments, a second gas flow is conducted through the second chamber, wherein the second gas inlet introduces the second gas flow into the chamber and the second gas outlet emits the second gas flow from the second chamber.

In some embodiments, the first gas outlet is connected to a first separating unit. In some embodiments, the first separating unit is a first cyclone separator. In some embodiments, residual powder, is carried by the first gas flow through the first gas outlet out of the first chamber and the first separating unit separates the residual powder from diluent and gas. In some embodiments, the separated, residual powder is introduced into the second chamber through a third powder inlet.

In some embodiments, the second gas outlet is connected to a second separating unit. In some embodiments, the second separating unit is a second cyclone separator. In some embodiments, residual powder is carried by the second gas flow through the second gas outlet out of the second chamber and the second separating unit separates the residual powder from diluent and gas. In some embodiments, the separated, residual powder is added to the powder discharged through the second powder outlet.

In some embodiments, the first and second gas flow is selected from the group consisting of a nitrogen gas flow, another inert gas flow, and a hydrocarbon gas flow. In some embodiments, the first and second gas flows as well as the diluent are recycled. In some embodiments, the first and second gas flow are part of a larger gas circulation pathway, wherein the first gas flow leads to a third separating unit that (a) separates gas from diluent and (b) the separated gas forms the second gas flow leading to the second gas inlet through the second chamber and out of the second gas outlet. In some embodiments, the third separating unit is a condensation tower. In some embodiments, the second gas flow, after having passed the second gas outlet and the second separating unit, leads to the first gas inlet of the first chamber and forms the first gas flow upon entering. In the condensation tower the diluent is liquefied and recovered.

In some embodiments, the third separating unit is a condensation tower which is cooled by a cooling fluid. In some embodiments, the diluent is also the cooling fluid. In some embodiments, the third separating unit includes a discharge unit for diluent.

In some embodiments, the gas circulation pathway includes a gas conveying device. In some embodiments, the second gas flow includes a first and a second gas conveying device. In some embodiments, the first gas conveying device is arranged in the gas circulation pathway downstream the third separating unit and upstream the second gas inlet and the second gas conveying device is arranged in the gas circulation pathway downstream the second gas outlet and upstream the first gas inlet. In some embodiments, the gas conveying devices are fans or blowers.

In some embodiments, gas and powder are heated inside the first and second chambers. In some embodiments, the temperature of the gas flow after leaving the chambers is decreased compared to the temperature of the gas introduced into the chambers. In some embodiments, the temperature of the gas flow is kept constant or increased.

In some embodiments, the recirculated and the discharge amounts of the dried powder are separated before these amounts are removed from the chamber using a second and a third powder outlet or both amounts are transferred through the second chamber powder outlet and are separated afterwards into the recirculated and discharge amounts. In some embodiments, the second separating unit provides a portion of the recirculated amount.

In some embodiments, the particles flow freely through the whole interior space of the drying chambers. In some embodiments, the drying chambers include installations which direct the flow of the particles within the drying chambers. In some embodiments, the first drying chamber is a back-mixing drying chamber. As used herein, the term "back-mixing drying chamber" applies to a chamber wherein the content can freely flow through the entire interior space of the chamber. In some embodiments, the second drying chamber is a back-mixing drying chamber or a plug-flow drying chamber. As used herein, the term "plug-flow drying chamber" applies to chamber wherein the particles move through the drying chamber with the same velocity.

In some embodiments, the facility includes one or more additional drying chambers between the first drying chamber and the second drying chamber. The pre-dried powder discharged from the first drying chamber is then passed through the additional drying chambers and finally a pre-dried powder is introduced into the second drying chamber. In some embodiments, the additional drying chambers reduce the average concentration of diluent, In some embodiments, the additional drying chambers have heating elements. In some embodiments, the additional drying chambers do not have heating elements.

In a general embodiment, the present disclosure provides a process for the preparation of a polyolefin including the steps of a) continuously polymerizing an olefin monomer in a diluent at temperatures of from about 20° C. to about 200° C. and pressures of from about 0.1 to about 20 MPa in the presence of a polymerization catalyst in a polymerization reactor, thereby yielding a slurry made from or containing solid polyolefin particles and a diluent, b) mechanically separating the polyolefin particles from an amount of the diluent, yielding a mixture of polyolefin powder and diluent having a lower content of diluent than the slurry obtained in polymerizing step a), and d) drying the mixture of polyolefin powder and diluent obtained in separating step b).

In some embodiments, the polyolefins are homopolymers or copolymers of olefins and of 1-olefins. As used herein, the term "1-olefin" includes hydrocarbons having terminal double bonds. In some embodiments, monomers are nonpolar olefinic compounds. In some embodiments, the nonpolar olefinic compounds are aryl-substituted 1-olefins. In some embodiments, 1-olefins are linear or branched $C_2$-$C_{12}$-1-alkenes, conjugated and nonconjugated dienes, or vinylaromatic compounds. In some embodiments, the linear $C_2$-$C_{12}$-1-alkenes are linear $C_2$-$C_{10}$-1-alkenes selected from the group consisting of ethylene, propylene, 1-butene, 1-pentene, 1-hexene, 1-heptene, 1-octene, and 1-decene. In some embodiments, the branched $C_2$-$C_{12}$-1-alkene is 4-methyl-1-pentene. In some embodiments, the diene is selected from the group consisting of 1,3-butadiene, 1,4-hexadiene and 1,7-octadiene. In some embodiments, the vinylaromatic compounds is selected from the group consisting of styrene and substituted styrene. In some embodiments, the monomers are a mixtures of various 1-olefins. In some embodiments, the olefins have the double bond as part of a cyclic structure. In some embodiments, the olefins have one or more ring systems. In some embodiments, the cyclic olefins are selected from the group consisting of cyclopentene, norbornene, tetracyclododecene, methylnorbornene, and dienes. In some embodiments, the dienes are selected from the group consisting of 5-ethylidene-2-norbornene, norbornadiene and ethylnorbornadiene. In some embodiments, the monomers are mixtures of two or more olefins.

In some embodiments, the process is for preparing homopolymers or copolymers of ethylene or propylene. In some embodiments, the comonomers in propylene polymerization are ethylene, 1-butene or both, used in an amount up to about 40 wt. % based upon the total weight of the resulting polymer.

In some embodiments, the process is for a polyolefin obtained by homopolymerizing or copolymerizing ethylene. In some embodiments, the ethylene is copolymerized with up to about 40 wt. % of $C_3$-$C_8$-1-alkenes, based upon the total weight of the resulting copolymer. In some embodiments, the $C_3$-$C_8$-1-alkenes is selected from the group consisting of 1-butene, 1-pentene, 1-hexene, 1-octene, and mixtures thereof. In some embodiments, the ethylene is copolymerized with up to about 20 wt. % of an alkene selected from the group consisting of 1-butene, 1-hexene, and mixtures thereof.

In some embodiments, the polyolefins are prepared by low-pressure polymerization methods carried out in the presence of a diluent, including solution and suspension or slurry processes conducted at temperatures in the range from about 20 to about 200° C., alternatively from about 30 to about 150° C., alternatively from about 40 to about 130° C., and under pressures of from about 0.1 to about 20 MPa, alternatively from about 0.3 to about 5 MPa. In some embodiments, the polymerization is carried out batchwise or continuously in one or more stages. In some embodiments, the polymerization is carried out in slurry. In some embodiments, the polymerization is carried out in loop reactors or stirred tank reactors. The polymerization takes place in a suspension medium, which is in liquid or in supercritical state under the conditions and in which the produced polyolefin is insoluble and forms solid particles. In some embodiments, the solids content of the slurry is in the range of from about 10 to about 60 wt.-%, based upon the total weight of the slurry, alternatively in the range of from about 20 to about 40 wt.-%.

In some embodiments, the suspension medium is made from or contains as the main component, a diluent. In some embodiments, the other components are selected from the group consisting of solved monomers or comonomers, solved cocatalysts or scavengers, solved reaction auxiliaries, and solved reaction products of the polymerization reaction. In some embodiments, the scavengers are aluminum alkyls. In some embodiments, the solved reaction auxiliaries are hydrogen. In some embodiments, the solved reaction products of the polymerization reaction are oligomers or waxes. In some embodiments, the diluents are inert, which do not decompose under reaction conditions. In some embodiments, the diluents are hydrocarbons having from 3 to 12 carbon atoms. In some embodiments, the diluents are saturated hydrocarbons selected from the group consisting of isobutane, butane, propane, isopentane, pentane, hexane or octane, and mixtures. In some embodiments, the diluents are unsaturated hydrocarbons. In some embodiments, the diluents are the monomers themselves. In some embodiments, the diluent's boiling point is different from the monomers and comonomers. In some embodiments, diluents are hydrocarbons having a boiling point above about 40° C., alternatively above about 60° C. In some embodiments, the polymerization takes place in a liquid suspension medium made from or containing more than about 50 wt. % of saturated hydrocarbons having a boiling point of above about 60° C. at about 0.1 MPa, alternatively more than about 80 wt.-% of saturated hydrocarbons having a boiling point of above about 60° C. at about 0.1 MPa.

In some embodiments, the polymerization is carried out in a cascade of at least two polymerization reactors which are connected in series. In some embodiments, these reactors are loop reactors or stirred tank reactors. In some embodiments, the cascade consists of two, three or four reactors. In some embodiments, the polymerization conditions in the polymerization reactors can differ by the nature or the amount of comonomers or by different concentrations of polymerization auxiliaries such as hydrogen.

In some embodiments, the process involves a slurry polymerization in loop reactors, where the polymerization mixture is pumped continuously through a cyclic reactor tube. In some embodiments, the pumped circulation prevents sedimentation of the suspended polymer. In some embodiments, the removal of the heat of reaction via the reactor wall is promoted by the pumped circulation. In some embodiments, these reactors consist of a cyclic reactor tube having an ascending leg and a descending leg which is enclosed by cooling jackets for removal of the heat of reaction and also horizontal tube sections which connect the vertical legs. In some embodiments, the impeller pump, the catalyst feed facilities, the monomer feed facilities, and the discharge facility are installed in the lower tube section. In some embodiments, the reactor has more than two vertical tube sections, providing a meandering arrangement.

In some embodiments, the slurry polymerization is an ethylene polymerization carried out in the loop reactor at an ethylene concentration of at least about 5 mole percent, alternatively at least about 10 mole percent, based on the suspension medium. In this context, "suspension medium" means the mixture of the fed suspension medium with the monomers dissolved therein.

In some embodiments, the polymerization is carried out using a catalyst selected from the group consisting of Phillips catalysts based on chromium oxide, titanium-based Ziegler- or Ziegler-Natta-catalysts, and single-site catalysts. As used herein, single-site catalysts are catalysts based on chemically uniform transition metal coordination compounds. In some embodiments, single-site catalysts are made from or contain bulky sigma- or pi-bonded organic ligands or catalysts based on late transition metal complexes. In some embodiments, the organic ligands are catalysts based on mono-Cp complexes or catalysts based on bis-Cp complexes. In some embodiments, the late transition metal complexes are iron-bisimine complexes. In some embodiments, the catalyst system is a mixtures of two or more of these catalysts.

In some embodiments, the catalysts are of the Ziegler type. In some embodiments, the Ziegler catalyst is made from or contains a compound of titanium or vanadium, a compound of magnesium and optionally a particulate inorganic oxide as support.

In some embodiments, the process involves drying bimodal or multimodal polyolefins. As used herein, the terms bimodal and multimodal refer to the modality of the molecular weight distribution. In some embodiments, the polymers are obtained from polymerizing olefins in a cascade of two or more polymerization reactors under different reaction conditions. In some embodiments, such bimodal or multimodal polyolefins are obtained by employing mixed catalysts. In some embodiments, the polyolefins have the molecular weight distribution and a comonomer distribution. In some embodiments, the average comonomer content of polymer chains with a higher molecular weight is higher than the average comonomer content of polymer chains with a lower molecular weight.

In some embodiments, the polyolefins are obtained as powder that means in form of small particles. In some embodiments, the particles have a more or less regular morphology and size, depending on the catalyst morphology and size, and on polymerization conditions. In some embodiments and depending on the catalyst used, the particles of the polyolefin powder have a mean diameter of from a few hundred to a few thousand micrometers. In some embodiments and in the case of chromium catalysts, the mean particle diameter is from about 300 to about 1600 μm. In some embodiments and in the case of Ziegler type catalysts, the mean particle diameter is from about 50 to about 3000 μm. In some embodiments, polyolefin powders have a mean particle diameter of from about 100 to about 250 μm.

In some embodiments, the polyolefins are polyethylenes having an ethylene content of from about 50 to about 100 wt. % based upon the total weight of the polyethylene, alternatively from about 80 to about 100 wt. %, alternatively from about 98 to about 100 wt. %. In some embodiments, the content of other olefins in the polyethylenes is from about 0 to about 50 wt. % based upon the total weight of the polyethylene, alternatively from about 0 to about 20 wt. %, alternatively from about 0 to about 2 wt. %.

In some embodiments, the density of the polyethylene compositions is from about 0.90 $g/cm^3$ to about 0.97 $g/cm^3$. In some embodiments, the density is in the range of from about 0.920 to about 0.968 $g/cm^3$, alternatively in the range of from about 0.945 to about 0.965 $g/cm^3$. The density is determined according to DIN EN ISO 1183-1:2004, Method A (Immersion) with compression molded plaques of 2 mm thickness which were pressed at 180° C., 20 MPa for 8 minutes with subsequent crystallization in boiling water for 30 minutes.

In some embodiments, the polyethylenes has a $MFR_{21.6}$ at a temperature of 190° C. under a load of 21.6 kg, determined according to DIN EN ISO 1133:2005, condition G, of from about 0.5 to about 300 g/10 min, alternatively of from about 1 to about 100 g/10 min, alternatively of from about 1.2 to about 100 g/10 min, alternatively of from about 1.5 to about 50 g/10 min.

FIG. 1 shows a schematic view of an embodiment of the process for preparing polyolefins, prior to the application of the drying method. The diluent for polymerizing the olefins in the first polymerization reactor (1) in slurry is fed to the reactor via feeding line (2) while the other components of the reaction mixture like catalyst, monomer, possible comonomers and polymerization auxiliaries are fed to the reactor via one or more feeding lines (3). As result of the polymerization in reactor (1) a slurry of solid polyolefin particle in a suspension medium is formed. This slurry is fed via line (4) to the second polymerization reactor (5) where further polymerization occurs. Fresh comonomer or further components of the reaction mixture can be fed to reactor (5) via one or more feeding lines (6). The slurry of reactor (5) is thereafter fed via line (7) to the third polymerization reactor (8) in which additional polymerization is carried out. One or more feeding lines (9) allow supplementary feeding of comonomer or further components of the reaction mixture to reactor (8). The slurry of solid polyolefin particle in the suspension medium formed in reactor (8) is continuously transferred via line (10) to moderating vessel (11). The mean residence time is about 20 min. The content of moderating vessel (11) is withdrawn by means of pump (12) via line (13), passed through heat exchanger (14) and transferred to collecting vessel (15). The slurry is cooled in moderating vessel (11). Slurry of a higher temperature is continuously added through line (10). Part of the suspension medium is evaporated, the generated gas is removed via line (16), and a part of the slurry cooled in heat exchanger (14) is returned via line (17) back to moderating vessel (11). To regulate the cooling or to suppress one or both of them, lines (16) and (17) are equipped with valves (18) and (19). The slurry is then passed via line (20) to centrifuge (21), where the solid polyolefin particles are separated from the liquid suspension medium. The isolated polyolefin particles, which after mechanical removal of the liquid suspension medium still have from about 10 to about 40 wt.-% of residual moisture based upon the total weight of the polyolefin particles, are conducted via line (22) to a dryer and dried. The isolated suspension medium is transferred via line (23) to a collecting vessel (24) and from there by pump (25) via line (26) to polymerization reactors (1), (5), (8), or any combination of the reactors. Line (26) and its branch-offs are equipped with valves (27), (28) and (29).

Figure 2:
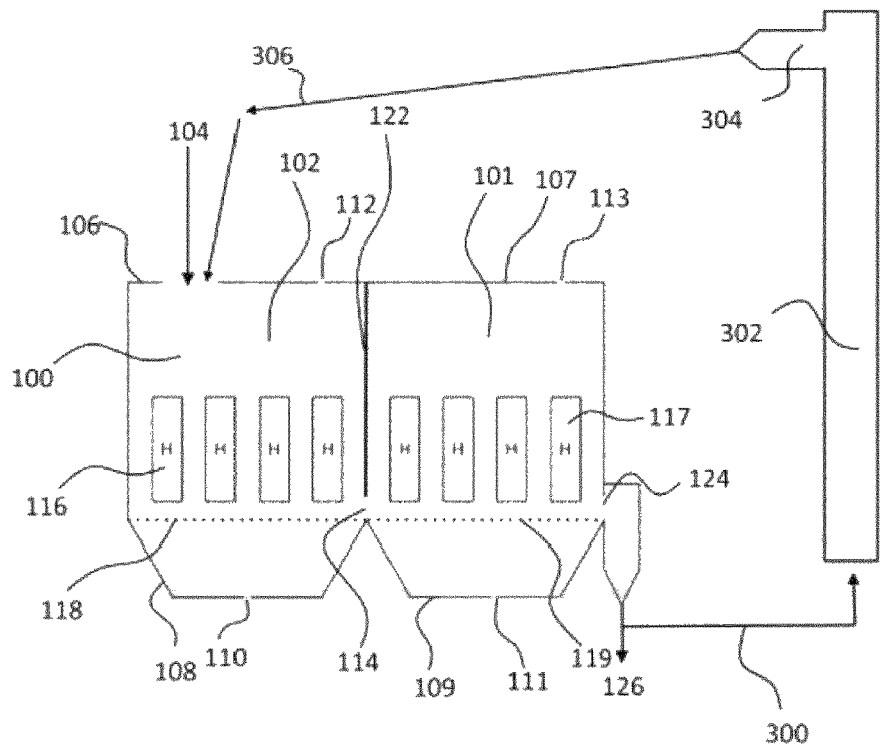
FIG. 2 is a schematic view of drying chambers for the preparation of a dried powder.

FIG. 2 shows schematic view of an embodiment of drying chambers. The facility includes a first drying chamber (100) with a first upper end section (106), an opposing first lower end section (108) and a first chamber side wall (122), the first drying chamber (100) includes a first heating element (116), a first powder inlet (104), a first powder outlet that is formed by the first powder passage which is an aperture (114), a first gas inlet (110) and a first gas outlet (112). The facility includes a second drying chamber (101) with a second upper end section (107), an opposing second lower end section (109) and a second chamber side wall that is on one side identical with the first chamber side wall (122), the second drying chamber (101) includes a second heating element (117), a second powder inlet that is formed by the first powder passage which is an aperture (114), a second powder outlet (124), a second gas inlet (111) and a second gas outlet (113). The first powder passage is (A) an aperture (114) through which more powder is transferred from the first into the second drying chamber than from the second into the first drying chamber and (B) the first powder outlet that is identical with the second powder inlet. A mixture of powder and diluent is introduced through the first powder inlet (104) into the heated first drying chamber (100) and the pre-dried powder is transferred into the heated second drying chamber (101) through the first powder passage (114). The majority of the diluent is removed from the powder by evaporation in the first and second drying chambers (100, 101), using a first gas flow (not shown) that enters the first chamber through the first gas inlet (110) and exits the first chamber (100) through the first gas outlet (112) and a second gas flow (not shown) that enters the heated second chamber (101) through the second gas inlet (111) and exits the second chamber through the second gas outlet (113). The powder is dried above a first grid (118) in the first chamber (100) and above a second grid (119) in the second chamber (101). The gas flows penetrate through the respective grids (118, 119) and take up evaporated diluent that is carried out of the chamber by way of the respective gas outlets (112, 113). A recirculated amount (300) of the powder (126) is transferred back into the first chamber (100) by a conveyor (302). The conveyor (302) transports the recirculated amount of the powder to the first powder inlet (104). The recirculated amount of the powder leaves the conveyor (302) through an exit (304) and travels along a pathway (306) into the first chamber (100). The pathway (306) is downward and powder travels along the pathway due to gravitational force. In another embodiment, the conveyor (302) is directly connected to the first chamber (100) such that the powder falls directly into the first chamber (100) without pathway (306). In some embodiments, the exit (304) is adjacent to the first powder inlet (104).

Figure 3:
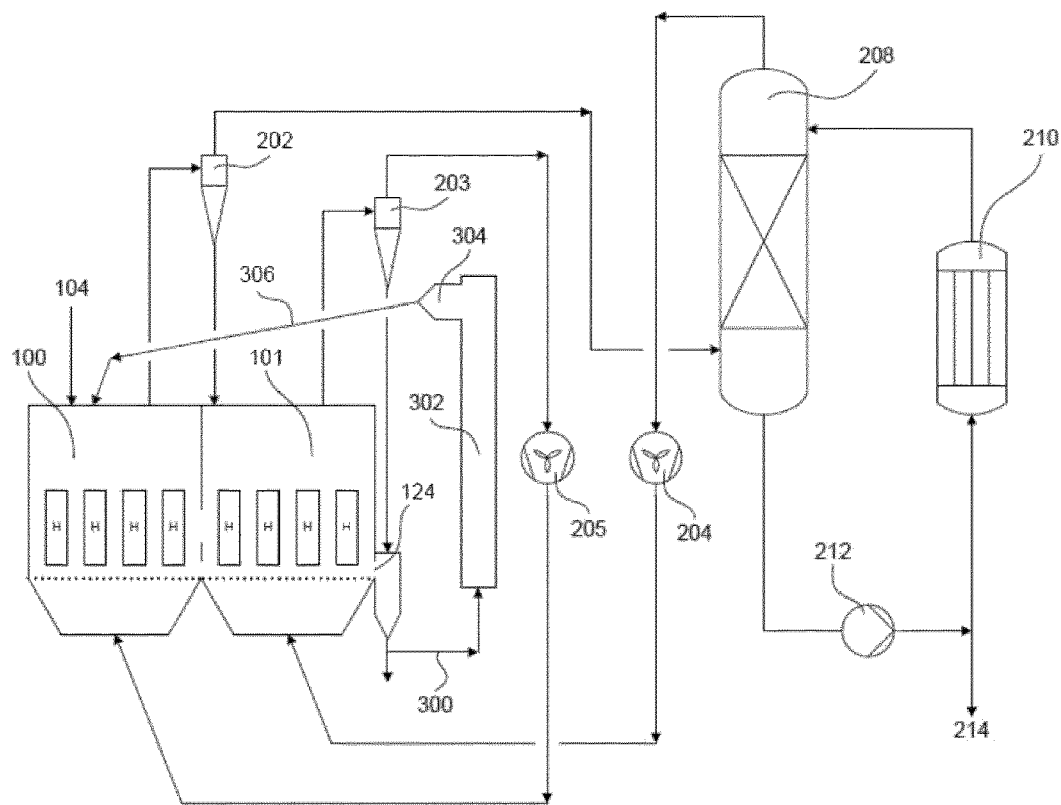
FIG. 3 is a schematic view of a facility for preparing a dried polymer powder.

FIG. 3 shows a schematic view of a facility. Gas circulating fans (204, 205), that are arranged external of the chambers (100, 101), transport the gas through each chamber (100, 101). Gas that exits through the second gas outlet (113) is freed of powder in a second cyclonic separation step (203). In some embodiments, the dried powder resulting from the second cyclonic separation (203) step is combined with powder that exits through the second powder outlet (124). The gas resulting from the second cyclonic separation step (203) is transported by a fan (205) into the first chamber (100) through the first gas inlet (110). Gas that exits through the first gas outlet (112) is freed of powder in a first cyclonic separation step (202). In some embodiments, the dried powder resulting from the first cyclonic separation (203) step is introduced into the second chamber through a third powder inlet (not shown) at the upper section (107) of the second chamber (101). The gas coming from the second cyclonic separation step (202) is transported to a condensation tower (208), where gas is separated from diluent, and transported by a fan (204) into the second chamber (101) through the second gas inlet (111). The condensation tower (208) is cooled using a cooler (210). Diluent separated in the condensation tower is pumped using a pump (212) in a circulating pathway. The diluent is used as a cooling agent and at the same time discharged continuously through a diluent outlet (214).

Figure 4:
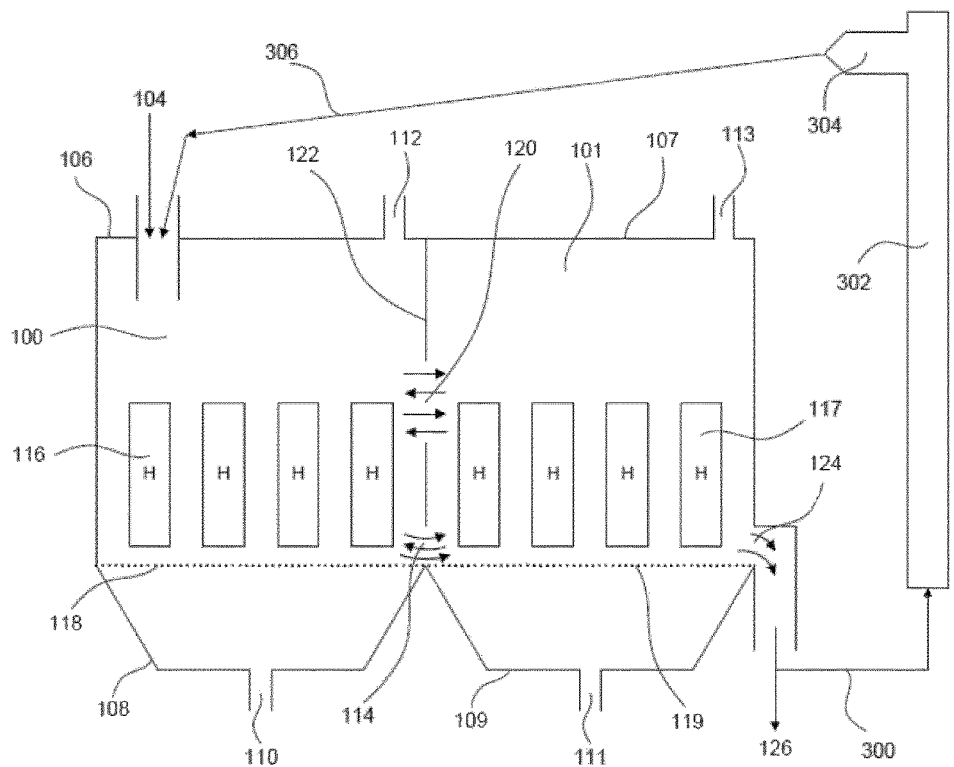
FIG. 4 is a schematic view of drying chambers for the preparation of a dried powder.

FIG. 4 shows a schematic view of an embodiment of drying chambers. Reference numbers are assigned in accordance with FIG. 2. FIG. 4 differs from FIG. 2 in that a second powder passage formed by another aperture (120) is provided for recirculating powder from the second drying chamber into the first drying chamber.

What is claimed is:
1. A method for the preparation of a dried powder in a facility comprising preparation steps:
  wherein the facility comprises
  i) a first drying chamber with a first upper end section, an opposing first lower end section and a first chamber side wall, the first drying chamber being a back-mixing drying chamber comprising a first heating element, a first powder inlet for receiving a mixture of powder and diluent, a first powder outlet for exiting a pre-dried powder, a first gas inlet and a first gas outlet,
  ii) a second drying chamber with a second upper end section, an opposing second lower end section and a second chamber side wall, the second drying chamber comprising a second heating element, a second powder inlet for receiving the pre-dried powder, a second powder outlet for exiting a dried powder comprising a recirculated amount of dried powder and a discharge amount of dried powder, a second gas inlet and a second gas outlet,
  iii) a first powder passage for transferring the pre-dried powder from the first drying chamber into the second drying chamber, having the first powder outlet con- nected to the second powder inlet or being identical with the second powder inlet, iv) a conveyor device and optionally a second powder passage for transferring the recirculated amount of dried powder from the second drying chamber into the first drying chamber, wherein in the facility, (A) the mixture of powder and diluent, having a first average concentration by weight of diluent based upon the total weight of the mixture, is introduced through the first powder inlet into the first drying chamber and (B) the pre-dried powder, having a second average concentration by weight of diluent based upon the total weight of the pre-dried powder, is transferred from the first drying chamber into the second drying chamber through the first powder passage, wherein a first amount of the diluent is removed from the mixture after passage through the first drying chamber, yielding the pre-dried powder, and a second amount of the diluent is removed from the pre-dried powder after passage through the second drying chamber, yielding the dried powder, having a third average concentration by weight of diluent based upon the total weight of the dried powder, wherein the first average concentration of diluent is higher than the second average concentration of diluent and the second average concentration of diluent is higher than the third average concentration of diluent, wherein (C) the recirculated amount of the dried powder is transferred from the second drying chamber into the first drying chamber using the conveyor device and optionally the second powder passage, and wherein (D) the discharge amount of the dried powder is discharged from the second drying chamber.

2. The method according to claim 1 comprising the following preparation steps:

a) introducing the mixture of powder and diluent through the first powder inlet into the first drying chamber, b) heating the mixture by the first heating element to a first temperature in a first gas flow introduced through the first gas inlet and discharged through the first gas outlet, yielding the pre-dried powder, c) transferring the pre-dried powder through the first powder passage into the second drying chamber, d) heating the pre-dried powder by the second heating element to a second temperature in a second gas flow introduced through the second gas inlet and discharged through the second gas outlet, yielding the dried powder comprising the recirculated amount of dried powder and the discharge amount of dried powder, e) transferring the recirculated amount of the dried powder through the conveyor device and optionally through the second powder passage from the second drying chamber into the first drying chamber, and discharging the discharge amount of the dried powder through the second powder outlet from the second drying chamber.

3. The method according to claim 2, wherein the first and second gas flows are selected from a nitrogen gas flow or a hydrocarbon gas flow.

4. The method according to claim 2, wherein an average combined residence time of powder in the first and second drying chamber is less than about 60 min.

5. The method according to claim 2, wherein the first average concentration of diluent in the mixture of powder and diluent is in the range of from about 15 wt. % to about 50 wt. % based upon the total weight of the mixture, and the third average concentration of diluent in the dried powder is less than about 10 wt. %, based upon the total weight of the dried powder.

6. The method according to claim 2, wherein the first gas flow, the second gas flow, and the diluents are recycled.

7. The method according to claim 2, wherein the average recirculated amount of the dried powder is in the range of about 5 to about 60 weight % based upon the average total weight of the dried powder.

8. The method according to claim 1, wherein the powder is a polymer powder.

9. The method according to claim 8, wherein the powder is a polyolefin powder.

10. The method according to claim 9, wherein the mixture of powder and diluent is a mixture of polyethylene and a hydrocarbon diluent.

11. The method according to claim 10, wherein the polyolefin is a bimodal or multimodal polyolefin.

12. The method according to claim 1, wherein the temperatures of the first and second heating elements are in the range from about 60 to about 125° C.

13. The method according to claim 1, wherein the facility further comprises a first grid as a first intermediate floor comprising a heat resistant material, wherein the first powder outlet and the first gas outlet are arranged above the first grid and the first gas inlet is arranged below the first grid such that the first grid separates the first powder inlet and the first powder outlet from the first gas inlet, wherein the first grid is a first intermediate floor upon which powder is deposited in the first chamber, wherein a first gas is conducted from the first gas inlet through the first grid into the first gas outlet.

14. The method according to claim 1, wherein the first chamber side wall (a) is a section of the second chamber side wall or is arranged next to the second chamber side wall and (b) comprises the first powder passage, which first powder passage is a first aperture in the first chamber side wall.

15. The method according to claim 1, wherein the conveyor is selected from the group consisting of a spiral conveyor, a tube chain conveyor and a pneumatic conveying device.

16. The method according to claim 1, wherein the first and second heating elements are of the tube bundle type or of the plate type and are arranged inside the chamber at a distance from the first and second chamber walls.

17. The method according to claim 1, wherein the first and second heating elements are heated using water or steam.

18. The method according to claim 1, wherein the facility further comprises a second grid as a second intermediate floor comprising a heat resistant material, wherein the second powder outlet and the second gas outlet are arranged above the second grid and the second gas inlet is arranged below the second grid such that the second grid separates the second powder inlet and the second powder outlet from the second gas inlet, wherein the second grid is a second intermediate floor upon which powder is deposited in the second chamber and a second gas is conducted from the second gas inlet through the second grid into the second gas outlet.

* * * * *

UNITED STATES PATENT AND TRADEMARK OFFICE
CERTIFICATE OF CORRECTION

PATENT NO. : 10,788,262 B2
APPLICATION NO. : 16/076198
DATED : September 29, 2020
INVENTOR(S) : Prang et al.

It is certified that error appears in the above-identified patent and that said Letters Patent is hereby corrected as shown below:

On the Title Page

Column 1, Item (30), Line 1, delete "16155648" and insert -- 16155648.5 --, therefor Signed and Sealed this
Third Day of January, 2023

Katherine Kelly Vidal
*Director of the United States Patent and Trademark Office*